(12) United States Patent
Isitman et al.

(10) Patent No.: US 11,118,036 B2
(45) Date of Patent: Sep. 14, 2021

(54) PNEUMATIC TIRE

(71) Applicant: THE GOODYEAR TIRE & RUBBER COMPANY, Akron, OH (US)

(72) Inventors: Nihat Ali Isitman, Ettelbruck (LU); Manuela Pompei, Reuler (LU); Eric Engeldinger, Attert (LU)

(73) Assignee: The Goodyear Tire & Rubber Company, Akron, OH (US)

(*) Notice: Subject to any disclaimer, the term of this patent is extended or adjusted under 35 U.S.C. 154(b) by 279 days.

(21) Appl. No.: 15/341,061

(22) Filed: Nov. 2, 2016

(65) Prior Publication Data

US 2017/0145195 A1    May 25, 2017

Related U.S. Application Data

(60) Provisional application No. 62/257,772, filed on Nov. 20, 2015.

(51) Int. Cl.
| | |
|---|---|
| *C08L 9/06* | (2006.01) |
| *B60C 1/00* | (2006.01) |
| *C08K 3/36* | (2006.01) |
| *C08L 9/00* | (2006.01) |

(52) U.S. Cl.
CPC ...... *C08L 9/06* (2013.01); *B60C 1/00* (2013.01); *B60C 1/0016* (2013.01); *C08K 3/36* (2013.01); *C08L 9/00* (2013.01); *C08L 2205/02* (2013.01); *C08L 2205/03* (2013.01); *Y02T 10/86* (2013.01)

(58) Field of Classification Search
CPC ............ B60C 1/00; B60C 1/0016; C08L 9/00
See application file for complete search history.

(56) References Cited

U.S. PATENT DOCUMENTS

| | | | |
|---|---|---|---|
| 5,395,891 A | 3/1995 | Obrecht et al. | |
| 5,504,135 A | 4/1996 | Ardrizzi et al. | |
| 5,672,639 A | 9/1997 | Corvasce et al. | |
| 6,103,808 A | 8/2000 | Hashimoto | |
| 6,133,364 A | 10/2000 | Obrecht et al. | |
| 6,146,520 A | 11/2000 | Gupte et al. | |
| 6,207,757 B1 | 3/2001 | Obrecht et al. | |
| 6,242,534 B1 | 6/2001 | Obrecht et al. | |
| 6,248,929 B1 | 6/2001 | Kaimai et al. | |
| 6,372,857 B1 | 4/2002 | Obrecht et al. | |
| 6,399,697 B1 | 6/2002 | Takasaki et al. | |
| 6,410,816 B2 | 6/2002 | Takasaki et al. | |
| 6,608,125 B2 | 8/2003 | Cruse et al. | |
| 7,342,070 B2 | 3/2008 | Tsukimawashi et al. | |
| 2001/0007049 A1 | 7/2001 | Takasaki et al. | |
| 2001/0023307 A1 | 9/2001 | Kaimai et al. | |
| 2002/0000280 A1 | 1/2002 | Scholl | |
| 2002/0045697 A1 | 4/2002 | Sohnen et al. | |
| 2003/0130535 A1 | 7/2003 | Deschler et al. | |
| 2006/0041063 A1 | 2/2006 | Cruse et al. | |
| 2011/0124771 A1* | 5/2011 | Sandstrom | B60C 1/00 523/158 |
| 2011/0144236 A1* | 6/2011 | Mihara | B60C 1/0016 523/158 |
| 2012/0123018 A1* | 5/2012 | Kanz | B60C 1/0016 523/158 |
| 2012/0157568 A1 | 6/2012 | Sandstrom et al. | |
| 2013/0096248 A1 | 4/2013 | Thompson | |
| 2015/0087745 A1 | 3/2015 | Chekanov et al. | |

FOREIGN PATENT DOCUMENTS

| | | |
|---|---|---|
| EP | 0839891 | 6/2004 |
| EP | 2468815 A1 | 6/2012 |
| ES | 2122917 | 7/1999 |
| FR | 3017870 * | 8/2015 |
| JP | 2002097369 | 4/2002 |
| JP | 2011094013 A | 5/2011 |
| JP | 2011144323 A | 7/2011 |
| JP | 2011246563 A | 12/2011 |
| JP | 2012092271 A | 5/2012 |
| JP | 2014205842 A | 10/2014 |
| WO | 2007047943 | 4/2007 |
| WO | 2012012133 A1 | 1/2012 |
| WO | 2013147827 A1 | 10/2013 |
| WO | 2015124679 A1 | 8/2015 |
| WO | 2015124681 A1 | 8/2015 |
| WO | 2015124684 A1 | 8/2015 |

OTHER PUBLICATIONS

Chinese Search Report (not dated) for Application Serial No. 201611016048.7.
European Search Report dated Mar. 23, 2017 for Application Serial No. EP16199105.
Japanese Search Report for Serial No. 2016-225016 dated Oct. 22, 2020.

* cited by examiner

*Primary Examiner* — Monique R Peets
(74) *Attorney, Agent, or Firm* — Mandy B. Willis; John D. De Long

(57) ABSTRACT

The present invention is directed to a pneumatic tire having a tread comprising a vulcanizable rubber composition comprising, based on 100 parts by weight of elastomer (phr), (A) from about 40 to about 90 phr of a solution polymerized styrene-butadiene rubber having a glass transition temperature (Tg) ranging from −40° C. to 0° C.;
(B) from about 60 to about 10 phr of polybutadiene; and
(C) from 5 to 50 phr of a hydrocarbon resin having a Tg ranging from −40° C. to 20° C.;
(D) optionally, a rubber process oil
(E) optionally, a hydrocarbon resin having a Tg ranging above 20° C.

wherein the total amount of hydrocarbon resins and oils is less than 65 phr, and the weight ratio of silica to the total of hydrocarbon resins and oils is greater than 2.

(F) from 70 to 130 phr of silica.

11 Claims, No Drawings

PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads.

SUMMARY OF THE INVENTION

The present invention is directed to a pneumatic tire having a tread comprising a vulcanizable rubber composition comprising, based on 100 parts by weight of elastomer (phr), (A) from about 40 to about 90 phr of a solution polymerized styrene-butadiene rubber having a glass transition temperature (Tg) ranging from −40° C. to 0° C.;

(B) from about 60 to about 10 phr of polybutadiene; and (C) from 5 to 50 phr of a hydrocarbon resin having a Tg ranging from −40° C. to 20° C.;

(D) optionally, a rubber process oil;

(E) optionally, a hydrocarbon resin having a Tg above 20° C.;

wherein the total amount of hydrocarbon resins and oils is less than 65 phr, and the weight ratio of silica to the total of hydrocarbon resins and oils is greater than 2; and (F) from 70 to 130 phr of silica.

DESCRIPTION OF THE INVENTION

There is disclosed to a pneumatic tire having a tread comprising a vulcanizable rubber composition comprising, based on 100 parts by weight of elastomer (phr), (A) from about 40 to about 90 phr of a solution polymerized styrene-butadiene rubber having a glass transition temperature (Tg) ranging from −40° C. to 0° C.;

(B) from about 60 to about 10 phr of polybutadiene; and (C) from 5 to 50 phr of a hydrocarbon resin having a Tg ranging from −40° C. to 20° C.;

(D) optionally, a rubber process oil;

(E) optionally, a hydrocarbon resin having a Tg above 20° C.;

wherein the total amount of hydrocarbon resins and oils is less than 65 phr, and the weight ratio of silica to the total of hydrocarbon resins and oils is greater than 2;

(F) from 70 to 130 phr of silica; and

The rubber composition includes from 40 to 90 phr of a styrene-butadiene rubber having a glass transition temperature (Tg) ranging from −40° C. to 0° C. The styrene-butadiene rubber may be functionalized with various functional groups, or the styrene-butadiene rubber may be non-functionalized. In one embodiment the styrene-butadiene rubber is functionalized with an alkoxysilane group and at least one of a primary amine group and thiol group. In one embodiment, the styrene-butadiene rubber is obtained by copolymerizing styrene and butadiene, and characterized in that the styrene-butadiene rubber has a primary amino group and/or thiol group and an alkoxysilyl group which are bonded to the polymer chain. In one embodiment, the alkoxysilyl group is an ethoxysilyl group. In one embodiment, the styrene-butadiene rubber is not functionalized.

The primary amino group and/or thiol group may be bonded to any of a polymerization initiating terminal, a polymerization terminating terminal, a main chain of the styrene-butadiene rubber and a side chain, as long as it is bonded to the styrene-butadiene rubber chain. However, the primary amino group and/or thiol group is preferably introduced to the polymerization initiating terminal or the polymerization terminating terminal, in that the disappearance of energy at a polymer terminal is inhibited to improve hysteresis loss characteristics.

Further, the content of the alkoxysilyl group bonded to the polymer chain of the (co)polymer rubber is preferably from 0.5 to 200 mmol/kg of styrene-butadiene rubber. The content is more preferably from 1 to 100 mmol/kg of styrene-butadiene rubber, and particularly preferably from 2 to 50 mmol/kg of styrene-butadiene rubber.

The alkoxysilyl group may be bonded to any of the polymerization initiating terminal, the polymerization terminating terminal, the main chain of the (co)polymer and the side chain, as long as it is bonded to the (co)polymer chain. However, the alkoxysilyl group is preferably introduced to the polymerization initiating terminal or the polymerization terminating terminal, in that the disappearance of energy is inhibited from the (co)polymer terminal to be able to improve hysteresis loss characteristics.

The styrene-butadiene rubber can be produced by polymerizing styrene and butadiene in a hydrocarbon solvent by anionic polymerization using an organic alkali metal and/or an organic alkali earth metal as an initiator, adding a terminating agent compound having a primary amino group protected with a protective group and/or a thiol group protected with a protecting group and an alkoxysilyl group to react it with a living polymer chain terminal at the time when the polymerization has substantially completed, and then conducting deblocking, for example, by hydrolysis or other appropriate procedure. In one embodiment, the styrene-butadiene rubber can be produced as disclosed in U.S. Pat. No. 7,342,070. In another embodiment, the styrene-butadiene rubber can be produced as disclosed in WO 2007/047943.

In one embodiment, and as taught in U.S. Pat. No. 7,342,070, the styrene-butadiene rubber is of the formula (I) or (II)

I wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

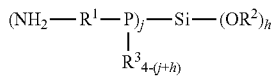

wherein P, $R^1$, $R^2$ and $R^3$ have the same definitions as give for the above-mentioned formula I, j is an integer of 1 to 3, and h is an integer of 1 to 3, with the provision that j+h is an integer of 2 to 4.

The terminating agent compound having a protected primary amino group and an alkoxysilyl group may be any of various compounds as are known in the art. In one embodiment, the compound having a protected primary amino group and an alkoxysilyl group may include, for example, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)-aminoethyltriethoxysilne, N,N-bis(trimethylsilyl)aminoethylmethyldimethoxysilane, N,N-bis(trimethylsilyl)aminoethylmethyldiethoxysilane, etc., and preferred are 1-trimethylsilyl-2,2-dimethoxy-1-aza-2-silacyclopentane, N,N-bis(trimethylsilyl) aminopropylmethyldimethoxysilane and N,N-bis(trimethylsilyl)aminopropylmethyldiethoxysilane. In one embodiment, the compound having a protected primary amino group and an alkoxysilyl group is N,N-bis(trimethylsilyl)aminopropyltriethoxysilane.

In one embodiment, the compound having a protected primary amino group and an alkoxysilyl group may be any compound of formula III

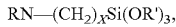

wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and X is an integer from 1 to 20. In one embodiment, at least one R' group is an ethyl radical. By appropriate post-treatment to yield a primary amine, it is meant that subsequent to reaction of the living polymer with the compound having a protected primary amino group and an alkoxysilyl group, the protecting groups are removed. For example, in the case of bis(trialkylsilyl) protecting group as in N,N-bis(trimethylsilyl)aminopropyltriethoxysilane, hydrolysis is used to remove the trialkylsilyl groups and leave the primary amine.

In one embodiment, the rubber composition includes from about 40 to about 90 phr of styrene-butadiene rubber functionalized with an alkoxysilane group and a primary amine group or thiol group.

Suitable styrene-butadiene rubbers functionalized with an alkoxysilane group and a primary amine group are available commercially, such as HPR 355 from Japan Synthetic Rubber (JSR).

In one embodiment, the solution polymerized styrene-butadiene rubber is as disclosed in WO 2007/047943 and is functionalized with an alkoxysilane group and a thiol, and comprises the reaction product of a living anionic polymer and a silane-sulfide modifier represented by the formula VII

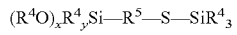

wherein Si is silicon; S is sulfur; O is oxygen; x is an integer selected from 1, 2 and 3; y is an integer selected from 0, 1, and 2; x+y=3; $R^4$ is the same or different and is ($C_1$-$C_{16}$) alkyl; and R' is aryl, and alkyl aryl, or ($C_1$-$C_{16}$) alkyl. In one embodiment, $R^5$ is a ($C_1$-$C_{16}$) alkyl. In one embodiment, each $R^4$ group is the same or different, and each is independently a $C_1$-$C_5$ alkyl, and $R^5$ is $C_1$-$C_5$ alkyl.

The solution polymerized styrene-butadiene rubber has a glass transition temperature in a range from −40° C. to 0° C. A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

Suitable styrene-butadiene rubbers functionalized with an alkoxysilane group and a thiol group are available commercially, such as Sprintan® SLR 4602 from Trinseo. Suitable non-functionalized styrene-butadiene rubbers are available commercially, such as Sprintan® SLR 4630 from Trinseo.

Another component of the rubber composition is from about 60 to about 10 phr of polybutadiene having a cis 1,4 content greater than 95 percent and a Tg ranging from −80 to −110° C. Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from about −95° C. to about −110° C. Suitable polybutadiene rubbers are available commercially, such as Budene® 1207 from Goodyear and the like, having a Tg of −104° C. and cis 1,4, content of about 97%.

The rubber composition may optionally include a processing oil from 1 to 30 phr. In one embodiment, the rubber composition is devoid of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, and low PCA oils, such as MES, TDAE, and heavy naphthenic oils, and vegetable oils such as sunflower, soybean, and safflower oils.

In one embodiment, the rubber composition includes a low PCA oil. Suitable low PCA oils include but are not limited to mild extraction solvates (MES), treated distillate aromatic extracts (TDAE), and heavy naphthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. TDAE oils generally have a Tg in a range of from about −44° C. to about −50° C. Heavy naphthenic oils generally have a Tg in a range of from about −42° C. to about −48° C. A suitable measurement for Tg of TDAE oils is DSC according to ASTM E1356, or equivalent.

Suitable low PCA oils include those having a polycyclic aromatic content of less than 3 percent by weight as determined by the IP346 method. Procedures for the IP346 method may be found in *Standard Methods for Analysis &*

*Testing of Petroleum and Related Products* and *British Standard* 2000 *Parts,* 2003, 62nd edition, published by the Institute of Petroleum, United Kingdom.

Suitable TDAE oils are available as Tudalen® SX500 from Klaus Dahleke KG, VivaTec® 400 and VivaTec® 500 from H&R Group, and Enerthene® 1849 from BP, and Extensoil® 1996 from Repsol. The oils may be available as the oil alone or along with an elastomer in the form of an extended elastomer.

Suitable vegetable oils include, for example, soybean oil, sunflower oil and canola oil which are in the form of esters containing a certain degree of unsaturation.

The rubber composition includes from 5 to 50 phr of a hydrocarbon resin having a glass transition temperature between −40° C. and 20° C. A suitable measurement of Tg for resins is DSC according to ASTM D6604 or equivalent. The hydrocarbon resin has a softening point between 0° C. and 70° C. as determined by ASTM E28 which might sometimes be referred to as a ring and ball softening point. In one embodiment, the rubber composition may additionally include a hydrocarbon resin having a glass transition temperature above 20° C. Such optional hydrocarbon resin may have a softening point above 70° C.

The hydrocarbon resin is selected from the group consisting of coumarone-indene resin, petroleum hydrocarbon resin, terpene polymers, styrene-alphamethylstyrene resins, terpene phenol resin, rosin derived resins and copolymers and/or mixtures thereof.

In one embodiment, the resin is a coumarone-indene resin containing coumarone and indene as the monomer components making up the resin skeleton (main chain). Monomer ingredients other than coumarone and indene which may be incorporated into the skeleton are, for example, methyl coumarone, styrene, alphamethylstyrene, methylindene, vinyltoluene, dicyclopentadiene, cycopentadiene, and diolefins such as isoprene and piperlyene. Suitable coumarone-indene resin is available commercially as Novares® C30 from Rutgers Novares GmbH.

Suitable petroleum resins include both aromatic and non-aromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species (olefins and diolefins containing an average of five carbon atoms) such as cyclopentadiene, dicyclopentadiene, diolefins such as isoprene and piperylene, and any C9 species (olefins and diolefins containing an average of 9 carbon atoms) such as vinyltoluene, alphamethylstyrene and indene. Such resins are made by any mixture formed from C5 and C9 species mentioned above.

In one embodiment, said resin may be a terpene resin comprised of polymers of at least one of limonene, alpha pinene, beta pinene, and delta-3-carene.

The styrene/alphamethylstyrene resin is considered herein to be a relatively short chain copolymer of styrene and alphamethylstyrene. The styrene/alphamethylstyrene resin may have, for example, a styrene content in a range of from about 10 to about 90 percent. In one aspect, such a resin can be suitably prepared, for example, by cationic copolymerization of styrene and alphamethylstyrene in a hydrocarbon solvent. Thus, the contemplated styrene/alphamethylstyrene resin can be characterized, for example, by its chemical structure, namely, its styrene and alphamethylstyrene contents and by its glass transition temperature, molecular weight and molecular weight distribution. Suitable styrene/alphamethylstyrene resin is available commercially as PURE 20 AS from Rutgers Novares GmbH.

Terpene-phenol resins may be used. Terpene-phenol resins may be derived by copolymerization of phenolic monomers with terpenes such as limonenes, pinenes and delta-3-carene.

In one embodiment, the resin is a resin derived from rosin and derivatives. Representative thereof are, for example, gum rosin, wood rosin and tall oil rosin. Gum rosin, wood rosin and tall oil rosin have similar compositions, although the amount of components of the rosins may vary. Such resins may be dimerized, polymerized or disproportionated. Such resins may be in the form of esters of rosin acids and polyols such as pentaerythritol or glycol.

In one embodiment, said resin may be partially or fully hydrogenated.

The rubber composition includes a combination of the optional processing oil, optional hydrocarbon resin of Tg above 20° C. and a hydrocarbon resin of Tg between −40° C. and 20° C. in an amount up to 65 phr.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 70 to about 130 phr of silica.

In one embodiment, the weight ratio of silica to the total of hydrocarbon resins and oils is greater than 2. In one embodiment, the weight ratio of silica to the total of hydrocarbon resins and oils is greater than 2.2.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, 315 etc.; silicas available from Rhodia, with, for example, designations of Z1165MP, Z165GR, Zeosil Premium® 200MP and silicas available from Degussa AG with, for example, designations VN2 and VN3, etc.

The vulcanizable rubber composition may include from about 5 to about 50 phr of carbon black.

Commonly employed carbon blacks can be used as a conventional filler. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639.

It may be preferred to have the rubber composition for use in the tire component to additionally contain a conventional sulfur containing organosilicon compound. Examples of suitable sulfur containing organosilicon compounds are of the formula:

Z-Alk-S$_n$-Alk-Z    VIII in which Z is selected from the group consisting of

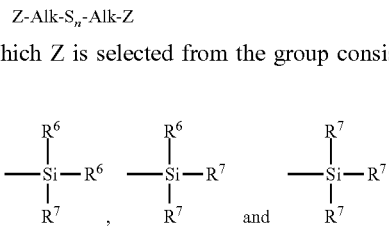

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide. Therefore, as to formula VIII, preferably Z is

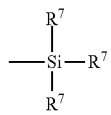

where $R^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)S—CH_2CH_2CH_2Si(OCH_2CH_3)_3$, which is available commercially as NXT™ from Momentive Performance Materials.

In another embodiment, suitable sulfur containing organosilicon compounds include compounds disclosed in U.S. Publication 2006/0041063. In one embodiment, the sulfur containing organosilicon compounds include the reaction product of hydrocarbon based diol (e.g., 2-methyl-1,3-propanediol) with S-[3-(triethoxysilyl)propyl] thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1 to 6 phr being preferred. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 5 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 6, preferably about 0.8 to about 3, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a tread of a tire.

The pneumatic tire of the present invention may be a race tire, passenger tire, aircraft tire, agricultural, earthmover, off-the-road, truck tire, and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

EXAMPLE

These examples illustrate rubber compositions according to the invention. Rubber compounds were mixed according to the formulations shown in Tables 1, 3 and 5, with amounts given in phr. The compounds were cured and tested for physical properties.

TABLE 1

| Composition | C1 | C2 | E3 |
|---|---|---|---|
| s-SBR [1] | 75 | 75 | 75 |
| cis-BR [2] | 25 | 25 | 25 |
| Traction resin A [3] | 10 | 10 | |
| Traction resin B [4] | | | 25 |
| TDAE oil | 15 | 15 | |
| Antioxidants | 4 | 4 | 4 |
| Stearic acid | 3 | 3 | 3 |
| Silane [6] | 7.2 | 8.0 | 7.2 |
| Silica [7] | 90 | | 90 |
| Silica [8] | | 80 | |
| ZnO | 2.5 | 2.5 | 2.5 |
| Sulfur | 1.2 | 1.2 | 1.2 |
| Accelerators | 4.6 | 4.9 | 4.6 |

[1] Functionalized, tin coupled, styrene/butadiene rubber of Tg about −25° C. obtained from Trinseo as Sprintan ® SLR4602.
[2] High cis polybutadiene, obtained as Budene ® 1207 from The Goodyear Tire & Rubber Company.
[3] Copolymer of styrene and alpha-methylstyrene, Tg = +39° C., obtained as Sylvatraxx ® 4401 from Arizona Chemicals
[4] Coumarone-indene resin, Tg = −10° C., obtained as Novares ® C30 from Rutgers
[6] TESPD type silane coupling agent
[7] Zeosil ® Z1165MP precipitated silica from Solvay with a CTAB surface area of 160 m$^2$/g
[8] Zeosil Premium ® 200MP precipitated silica from Solvay with a CTAB surface area of 200 m$^2$/g

TABLE 2

| Composition | C1 | C2 | E3 |
|---|---|---|---|
| s-SBR [1] | 75 | 75 | 75 |
| cis-BR [2] | 25 | 25 | 25 |

TABLE 2-continued

| Composition | C1 | C2 | E3 |
|---|---|---|---|
| TDAE Oil (as polymer extender oil) | 0 | 0 | 0 |
| TDAE Oil (as free process oil) | 15 | 15 | 0 |
| Traction resin A (Tg = +39° C.) | 10 | 10 | 0 |
| Traction resin B (Tg = −10° C.) | 0 | 0 | 25 |
| Shore A | 65 | 64 | 64 |
| Modulus at 300% strain (MPa) [1] | 11.9 | 10.2 | 10.9 |
| Tensile strength (MPa) [1] | 17.5 | 16.7 | 19.0 |
| Elongation at break (%) [1] | 462 | 492 | 482 |
| Wet grip laboratory prediction | | | |
| Rebound at 0° C. [2] | 11.1 | 11.7 | 9.9 |
| Rolling resistance laboratory prediction | | | |
| Rebound at 100° C. [2] | 58.9 | 60.8 | 61.0 |
| Wear resistance laboratory prediction | | | |
| Relative Volume Loss (mm³) [3] | 131 | 132 | 126 |

[1] Data according to Automated Testing System instrument by the Instron Corporation. Such instrument may determine ultimate tensile, ultimate elongation, modulii, etc. Data reported in the Table is generated by running the ring tensile test station which is an Instron 4201 load frame.
[2] Rebound is a measure of hysteresis of the compound when subject to loading, as measured by ASTM D1054. Generally, the lower the measured rebound at 100° C., the lower the rolling resistance. And, generally, the lower the measured rebound at 0° C., the better the grip on wet road surface.
[3] Data according to DIN 53516 abrasion resistance test procedure using a Zwick drum abrasion unit, model 6102 with 2.5 Newtons force. DIN standards are German test standards. The DIN abrasion results are reported as relative values to a control rubber composition used by the laboratory. Generally, the lower the relative volume loss, the higher the abrasion resistance of the rubber compound.

From examples of Table 1 and tested compound properties of Table 2, it is observed that:

(A) For Experimental rubber Sample E3, the free TDAE oil and traction resin A of medium Tg (+39° C.) in the rubber formulation was replaced by traction resin B of low Tg (−10° C.), respectively. The remaining composition of the sample was identical to Control rubber C1. As a result, the predictive wet grip performance was improved or maintained based on Rebound 0° C. value of 9.9 as compared to a value of 11.1 for Control rubber Sample C1. Simultaneously, the predictive rolling resistance performance was improved based on Rebound 100° C. values of 61.0 compared to 58.9 for Control rubber Sample C1. Furthermore, it is observed that Experimental rubber sample E3 yielded lower relative volume loss upon abrasion which is predictive of improving the wear performance of a tire tread of this rubber composition.

The examples of Table 1 and tested rubber compound properties of Table 2 demonstrate, for rubber compositions made of a styrene butadiene elastomer that contains no extender process oil, that the replacement of the free process oil and traction resin of medium Tg in the rubber formulation with a traction resin of low Tg is beneficial in obtaining an improved predictive wet grip, rolling resistance and wear resistance of tire tread rubber compositions.

TABLE 3

| Composition | C4 | E5 | C6 | E7 |
|---|---|---|---|---|
| s-SBR [1] | 103.25 | 103.25 | 103.25 | 103.25 |
| cis-BR [2] | 25 | 25 | 25 | 25 |
| Traction resin A [3] | 8 | 0 | 8 | 0 |
| Traction resin B [4] | 0 | 18 | 0 | 18 |
| TDAE oil | 10 | 0 | 10 | 0 |
| Antioxidants | 4 | 4 | 4 | 4 |
| Stearic acid | 3 | 3 | 3 | 3 |
| Silane [5] | 8.8 | 8.8 | 10 | 10 |
| Silica [6] | 110 | 110 | 0 | 0 |
| Silica [7] | 0 | 0 | 100 | 100 |
| ZnO | 2.5 | 2.5 | 2.5 | 2.5 |
| Sulfur | 1.6 | 1.6 | 1.6 | 1.6 |
| Accelerators | 4.6 | 4.6 | 4.9 | 4.9 |

[1] Solution polymerized, silicon coupled, oil extended SBR with 37.5 phr TDAE oil of Tg about −29° C. obtained from Trinseo as Sprintan SLR4630.
[2] High cis polybutadiene, obtained as Budene 1207 from The Goodyear Tire & Rubber Company.
[3] Copolymer of styrene and alpha-methylstyrene, Tg = +39° C., obtained as Sylvatraxx4401 from Arizona Chemicals
[4] Coumarone-indene resin, Tg = −10° C., obtained as Novares C30 from Rutgers
[5] TESPD type silane coupling agent
[6] Zeosil Z1165MP precipitated silica from Solvay with a CTAB surface area of 160 m²/g
[7] Zeosil Premium 200MP precipitated silica from Solvay with a CTAB surface area of 200 m²/g

TABLE 4

| Composition | C4 | E5 | C6 | E7 |
|---|---|---|---|---|
| s-SBR [1] | 103.25 | 103.25 | 103.25 | 103.25 |
| cis-BR [2] | 25 | 25 | 25 | 25 |
| TDAE Oil (as polymer extender oil) | 28.25 | 28.25 | 28.25 | 28.25 |
| TDAE Oil (as free process oil) | 8 | 0 | 8 | 0 |
| Traction resin A (Tg = +39° C.) | 10 | 0 | 10 | 0 |
| Traction resin B (Tg = −10° C.) | 0 | 18 | 0 | 18 |
| Shore A | 70 | 69 | 68 | 68 |
| Modulus at 300% strain (MPa) [1] | 10.7 | 9.6 | 8.5 | 11.4 |
| Tensile strength (MPa) [1] | 14.8 | 17.6 | 15.2 | 15.8 |
| Elongation at break (%) [1] | 417 | 510 | 494 | 424 |
| Wet grip laboratory prediction | | | | |
| Rebound at 0° C. [2] | 10.2 | 10.1 | 9.7 | 9.9 |
| Rolling resistance laboratory prediction | | | | |
| Rebound at 100° C. [2] | 56.7 | 53.8 | 57.0 | 56.5 |
| Wear resistance laboratory prediction | | | | |
| Relative Volume Loss (mm³) [3] | 170 | 164 | 173 | 164 |

From examples in Table 3 and tested rubber properties of Table 4, it is observed that:

(A) For Experimental rubber Sample E5, the free TDAE oil and traction resin A of medium Tg (+39° C.) in the rubber formulation was replaced by traction resin B of low Tg (−10° C.), respectively. The remaining composition of the sample was identical to Control rubber C4. As a result, the predictive wet grip performance was maintained constant based on Rebound 0° C. value of 10.1 as compared to a value of 10.2 for Control rubber Sample C4. However, the predictive rolling resistance performance was deteriorated based on Rebound 100° C. value of 53.8 compared to 56.7 for Control rubber Sample C4.

(B) The control rubber Sample C6 is made as a modification of the Control rubber Sample C4 by replacing the precipitated silica with a CTAB surface area of 160 m² with a silica with a CTAB surface area of 200 m²/g. For Experimental rubber Sample E7, the free TDAE oil and traction resin A of medium Tg (+39° C.) was replaced by traction resin B of low Tg (−10° C.). The remaining composition of the samples was identical to Control rubber Sample C6. As a result, the predictive wet grip and rolling resistance performances were deteriorated based on Rebound 0° C. and Rebound 100° C. values of 9.7 and 57.0, respectively as compared to values of 9.9 and 56.5 for Control rubber Sample C6.

The examples of Table 3 and tested rubber compound properties of Table 4 demonstrate, for rubber compositions made of a styrene butadiene elastomer that contains an extender process oil, that the replacement of the free process oil and traction resin of medium Tg in the rubber formulation with a traction resin of low Tg does not essentially provide the benefits of improved predictive wet grip and/or rolling resistance at maintained or improved predicted wear resistance observed in the preceding example of Table 1 and 2.

Thereby, it is desired to evaluate a rubber composition containing a styrene butadiene elastomer which contains a lower amount of extender process oil than the elastomer shown in examples of Table 3, so that the extender oil is replaced by a traction resin of varying Tg.

TABLE 5

| Composition | C8 | E9 | E10 | E11 |
|---|---|---|---|---|
| s-SBR [1] | 103.25 | 0 | 0 | 0 |
| s-SBR [2] | 0 | 93.75 | 93.75 | 93.75 |
| cis-BR [3] | 25 | 25 | 25 | 25 |
| Traction resin A [4] | 12 | 21.45 | 0 | 0 |
| Traction resin B [5] | 0 | 0 | 21.45 | 0 |
| Traction resin C [6] | 0 | 0 | 0 | 21.45 |
| TDAE oil | 5 | 5 | 5 | 5 |
| Antioxidants | 5.7 | 5.7 | 5.7 | 5.7 |
| Stearic acid | 2.5 | 2.5 | 2.5 | 2.5 |
| Silane [7] | 8.96 | 8.96 | 8.96 | 8.96 |
| Silica [8] | 112 | 112 | 112 | 112 |
| ZnO | 2.5 | 2.5 | 2.5 | 2.5 |
| Sulfur | 1.6 | 1.6 | 1.6 | 1.6 |
| Accelerators | 5.0 | 5.0 | 5.0 | 5.0 |

[1] Solution polymerized, oil extended SBR of Tg about −25° C., with styrene content of 34% and vinyl content of 38%, with 37.5 phr extender TDAE oil obtained from Asahi Chemical as Tufdene ® E680.
[2] Solution polymerized, oil extended SBR of Tg about −25° C., with styrene content of 34% and vinyl content of 38%, with 25 phr extender TDAE oil.
[3] High cis polybutadiene, obtained as Budene ® 1207 from The Goodyear Tire & Rubber Company.
[4] Copolymer of styrene and alpha-methylstyrene, Tg = +39° C., obtained as Sylvatraxx ® 4401 from Arizona Chemicals
[5] Coumarone-indene resin, Tg = −10° C., obtained as Novares ® C30 from Rutgers
[6] Copolymer of styrene and alpha-methylstyrene, Tg = +80° C., obtained as Norsolene ® W120 from Cray Valley.
[7] TESPD type silane coupling agent
[8] Zeosil ® Z1165MP precipitated silica from Solvay with a CTAB surface area of 160 m$^2$/g

TABLE 6

| Composition | C8 | E9 | E10 | E11 |
|---|---|---|---|---|
| s-SBR (1) | 103.25 | 0 | 0 | 0 |
| s-SBR (2) | 0 | 93.75 | 93.75 | 93.75 |
| cis-BR | 25 | 25 | 25 | 25 |
| TDAE Oil (as polymer extender oil) | 28.25 | 18.75 | 18.75 | 18.75 |
| TDAE Oil (as free process oil) | 5 | 5 | 5 | 5 |
| Traction resin A (Tg: +39° C.) | 12 | 21.45 | 0 | 0 |
| Traction resin B (Tg: −10° C.) | 0 | 0 | 21.45 | 0 |
| Traction resin C (Tg: +80° C.) | 0 | 0 | 0 | 21.45 |
| Shore A | 68 | 69 | 67 | 68 |
| Modulus at 300% strain (MPa) [1] | 10.2 | 10.6 | 10.3 | 10.8 |
| Tensile strength (MPa) [1] | 20.2 | 20.2 | 19.5 | 21.1 |
| Elongation at break (%) [1] | 520 | 515 | 508 | 523 |
| Wet grip laboratory prediction | | | | |
| Rebound at 0° C. [2] | 7.9 | 8.2 | 7.7 | 9.5 |
| Rolling resistance laboratory prediction | | | | |
| Rebound at 100° C. [2] | 50.5 | 49.8 | 52.8 | 47.9 |
| Wear resistance laboratory prediction | | | | |
| Relative Volume Loss (mm$^3$) [3] | 177 | 174 | 162 | 176 |

From examples of Table 5 and tested rubber properties of Table 6, it is observed that:

(A) For Experimental rubber Sample E9, part of the extender oil in the rubber formulation was replaced by traction resin A of medium Tg (+39° C.). The remaining composition of the sample was identical to Control rubber C8. As a result, the predictive wet grip performance was maintained constant based on Rebound 0° C. value of 10.1 as compared to a value of 10.2 for Control rubber Sample C8. However, the predictive rolling resistance performance was deteriorated based on Rebound 100° C. value of 53.8 compared to 56.7 for Control rubber Sample C8.

(B) For Experimental rubber Sample E10, part of the extender oil and traction resin A of medium Tg (+39° C.) was replaced by traction resin B of low Tg (−10° C.). The remaining composition of the samples was identical to Control rubber Sample C8. As a result, the predictive wet grip and rolling resistance performances were simultaneously improved based on Rebound 0° C. and Rebound 100° C. values of 7.7 and 52.8, respectively as compared to values of 7.9 and 50.5 for Control rubber Sample C8.

(C) For Experimental rubber Sample E11, part of the extender oil and traction resin A of medium Tg (+39° C.) was replaced by traction resin B of high Tg (+80° C.). The remaining composition of the samples was identical to Control rubber Sample C8. As a result, the predictive wet grip and rolling resistance performances deteriorated based on Rebound 0° C. and Rebound 100° C. values of 9.5 and 47.9, respectively as compared to values of 7.9 and 50.5 for Control rubber Sample C8.

The examples of Table 5 and tested rubber compound properties of Table 6 demonstrate that the partial replacement of the polymer extender oil and traction resin of medium Tg in the rubber formulation with a traction resin of low Tg is beneficial in obtaining an improved predictive wet grip, rolling resistance and wear resistance of tire tread rubber compositions.

While certain representative embodiments and details have been shown for the purpose of illustrating the subject invention, it will be apparent to those skilled in this art that various changes and modifications can be made therein without departing from the scope of the subject invention.

What is claimed:

1. A pneumatic tire having a tread comprising a vulcanizable rubber composition comprising, based on 100 parts by weight of elastomer (phr),
   (A) from about 40 to about 90 phr of a solution polymerized styrene-butadiene rubber having a glass transition temperature (Tg) ranging from −40° C. to 0° C.;
   (B) from about 60 to about 10 phr of polybutadiene; and
   (C) from 25 to 50 phr of a hydrocarbon resin having a Tg ranging from −40° C. to −10° C.;
   (D) optionally, a rubber process oil; and
   (E) from 90 to 130 phr of silica;
   wherein the weight ratio of silica to the total of hydrocarbon resins and oils is at least 3.6.

2. The pneumatic tire of claim 1, wherein the solution polymerized styrene-butadiene rubber is functionalized with an alkoxysilane group and at least one functional group selected from the group consisting of primary amines and thiols.

3. The pneumatic tire of claim 1, wherein the hydrocarbon resin having a Tg ranging from −40° C. to −10° C. is a coumarone-indene resin.

4. The pneumatic tire of claim 1, wherein the hydrocarbon resin having a Tg ranging from −40° C. to −10° C. resin is derived from styrene and alphamethylstyrene.

5. The pneumatic tire of claim 1, wherein the vulcanizable rubber composition further comprises a hydrocarbon resin having a Tg higher than 20° C. and is derived from styrene and alphamethylstyrene.

6. The pneumatic tire of claim 1, wherein the oil is selected from the group consisting of aromatic, paraffinic, naphthenic, MES, TDAE, heavy naphthenic oils, and vegetable oils.

7. The pneumatic tire of claim 1, wherein the hydrocarbon resin having a Tg ranging from −40° C. to −10° C. is a coumarone-indene resin comprising residues of coumarone, indene, and at least one residues selected from the group consisting of methyl coumarone, styrene, α-methylstyrene, methylindene, vinyltoluene, dicyclopentadiene, cycopentadiene, and diolefins such as isoprene and piperlyene.

8. The pneumatic tire of claim 1, wherein the solution polymerized styrene-butadiene rubber functionalized with an alkoxysilane group and a primary amine group, and is represented by the formula (1) or (2)

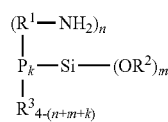 (1)

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

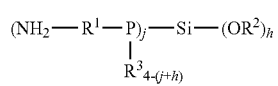 (2)

wherein P, $R^1$, $R^2$ and $R^3$ have the same definitions as give for the above-mentioned formula (1), j is an integer of 1 to 3, and h is an integer of 1 to 3, with the provision that j+h is an integer of 2 to 4.

9. The pneumatic tire of claim 1, wherein the solution polymerized styrene-butadiene rubber is functionalized with an alkoxysilane group and a primary amine group comprises the reaction product of a living polymer chain and a terminating agent of the formula

 I wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and X is an integer from 1 to 20.

10. The pneumatic tire of claim 1 wherein the solution polymerized styrene-butadiene rubber is functionalized with an alkoxysilane group and a thiol, and comprises the reaction product of a living anionic polymer and a silane-sulfide modifier represented by the formula

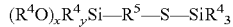

wherein Si is silicon; S is sulfur; O is oxygen; x is an integer selected from 1, 2 and 3; y is an integer selected from 0, 1, and 2; x+y=3; $R^4$ is the same or different and is $(C_1$-$C_{16})$ alkyl; and $R^5$ is aryl, and alkyl aryl, or $(C_1$-$C_{16})$ alkyl.

11. A pneumatic tire having a tread comprising a vulcanizable rubber composition comprising, based on 100 parts by weight of elastomer (phr),
(A) from about 40 to about 90 phr of a solution polymerized styrene-butadiene rubber having a glass transition temperature (Tg) ranging from −40° C. to 0° C.;
(B) from about 60 to about 10 phr of polybutadiene; and
(C) from 25 to 50 phr of a hydrocarbon resin having a Tg ranging from −40° C. to −10° C.;
(D) optionally, a rubber process oil
(E) optionally, a hydrocarbon resin having a Tg ranging above 20° C. wherein the total amount of hydrocarbon resins and oils is less than 65 phr, and the weight ratio of silica to the total of hydrocarbon resins and oils is greater than 2; and
(F) from 70 to 130 phr of silica;
wherein the weight ratio of silica to the total of hydrocarbon resins and oils is at least 3.6.

* * * * *